July 18, 1939.      A. G. PETERKIN      2,166,177
PREPARATION OF HYDROCARBONS FOR CONVERSION
Filed Feb. 27, 1936      2 Sheets—Sheet 1
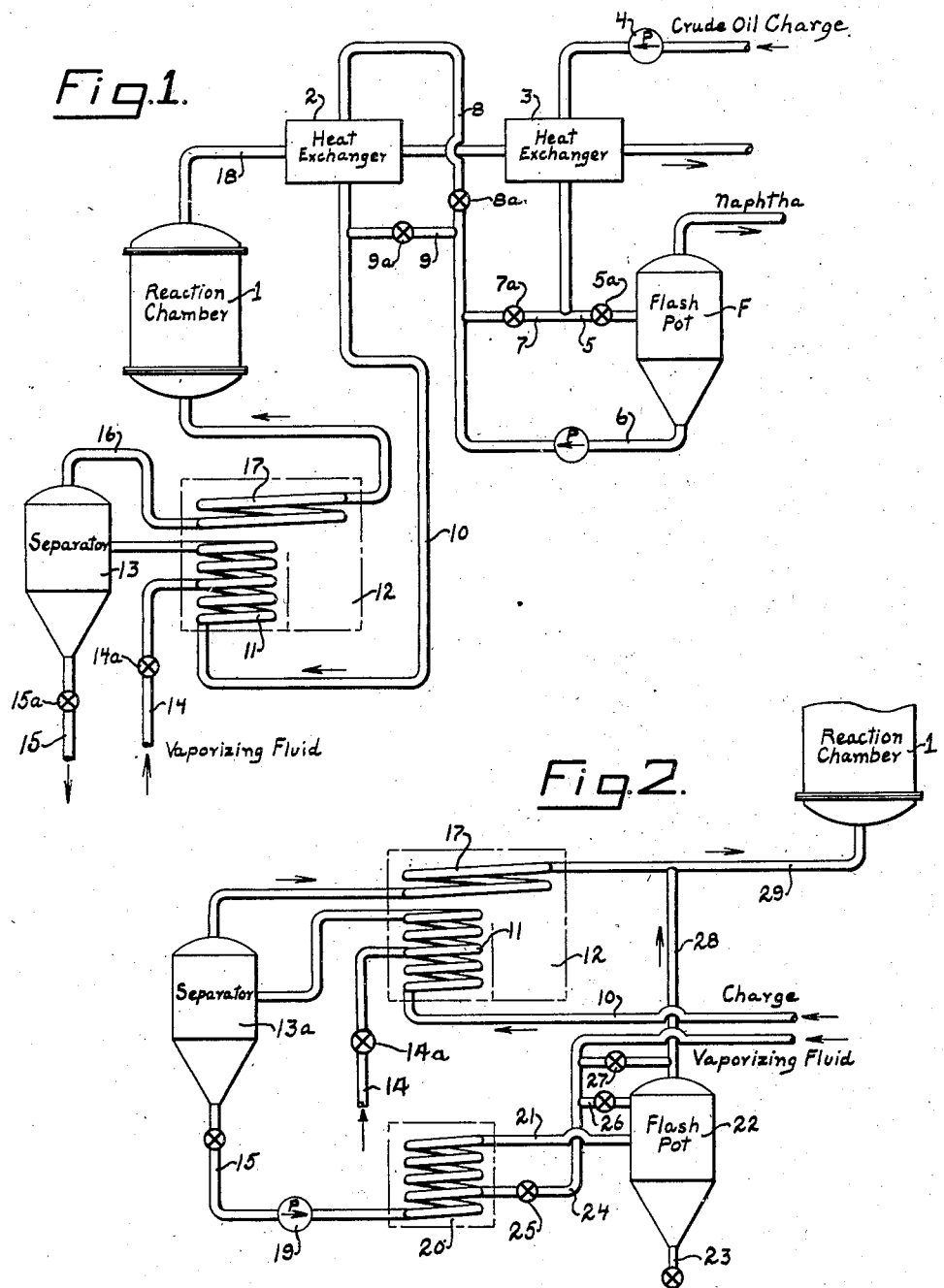
INVENTOR
ALBERT G. PETERKIN
BY
Ira R. Nickerson
ATTORNEY

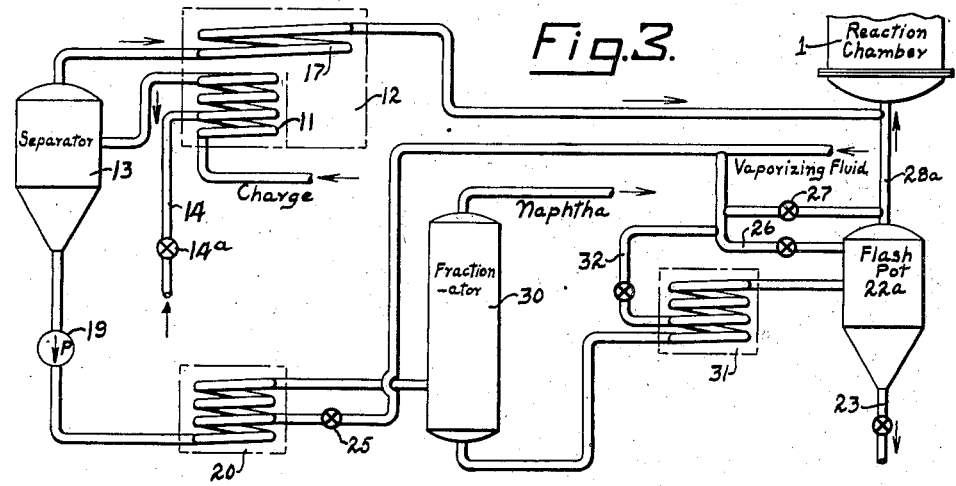
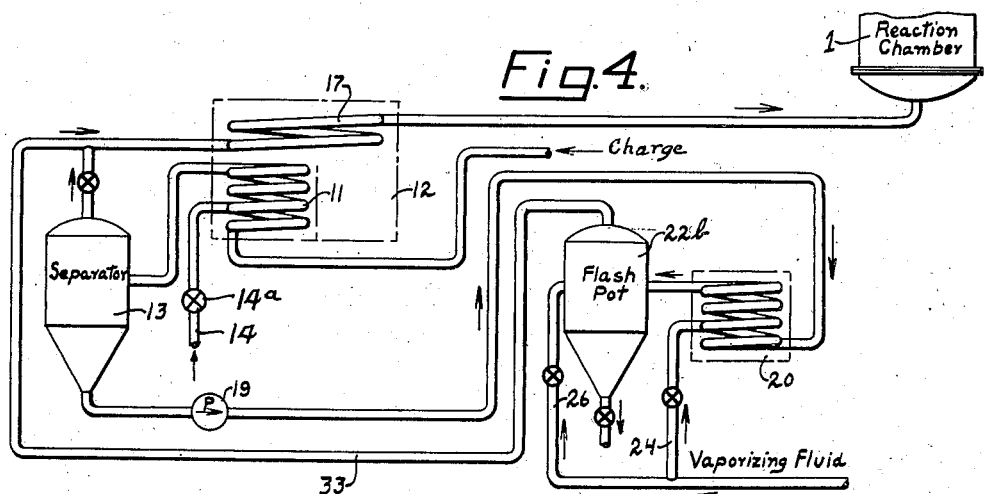
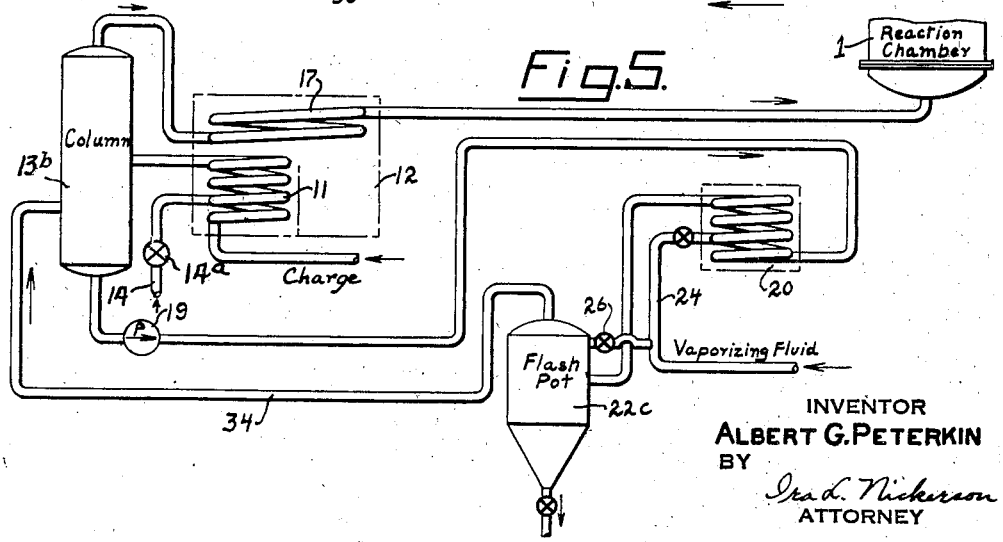

Patented July 18, 1939

2,166,177

UNITED STATES PATENT OFFICE 2,166,177

PREPARATION OF HYDROCARBONS FOR CONVERSION

Albert G. Peterkin, Bryn Mawr, Pa., assignor to Houdry Process Corporation, Dover, Del., a corporation of Delaware Application February 27, 1936, Serial No. 65,955

9 Claims. (Cl. 196—49)

The present invention relates to the art of treating materials, for example, composite materials such as complex hydrocarbon materials or fluids, and more particularly to the preparation or preliminary treatment of such materials for a subsequent transforming or converting operation.

In the treatment of materials, such as composite hydrocarbons whether of petroleum, coal, shale or other origin, natural or artificial, it is often desirable to present the reactant material in a vaporous form. This condition is desired, in many instances, where such hydrocarbons are to be subjected to a conversion, transformation or like reaction, whether the reaction be effected thermally, catalytically, or otherwise, and particularly when it is effected catalytically.

Various suggestions, different from the method or methods of this invention, have been made concerning such reactions and preparing reactants therefor. Some involve directly heating the charge to a high enough temperature to substantially vaporize it, but such attempts, with many composite hydrocarbons having a wide or fairly wide boiling range and containing high boiling materials, as for example heavy fuel oils, have frequently been attended with a considerable amount of conversion which results in the production of high amounts of gas and coky or other deposits in the heating apparatus and other equipment and, in certain cases, of a low grade gasoline. Still other methods for the preparation of a charge for a converter, including division into several cuts or fractions, have been proposed which are costly or disadvantageous from a heat consumption standpoint, from the aspect of equipment required, from the point of a too high proportion of the starting material being lost to the process, or for other reasons.

My present invention, while having some general relation to that involved in my copending application, Serial No. 65,013, filed February 21, 1936, distinguishes therefrom. In particular, in the present invention a bottoms fraction is separated from the composite fluid charge (e. g., crude petroleum oil or topped crude) and the bottoms fraction is subjected to a viscosity breaking or mild conversion before, possibly, being recombined with vapors from the original charge which are being passed to a cracking or transforming zone; whereas in my aforesaid copending application, bottoms separated from the charge are vaporized to a major extent by the combined use of heat and a vaporizing fluid, such as steam, and the vapors so produced from such bottoms may be recombined with an intermediate fraction from the original charge (e. g., a gas oil fraction) and passed to a cracking zone.

The present invention provides an operation requiring low heat consumption and a minimum of equipment, whereby a vaporous charge for a conversion or reaction can be prepared from a composite starting material, such as crude petroleum oil or fractions thereof, which cannot be directly vaporized completely by heat alone without disadvantageous effects, such as indicated above. Also, the present invention provides an operation wherein a maximum or large proportion of the starting material is supplied in vapor form, ordinarily and preferably in superheated vapor form, to a reaction chamber or converter and substantially a minimum of the starting material or crude feed, e. g., crude oil, is lost to the conversion or reaction process. In the practice of this invention, it is, in many instances, desirable in the preparation of reactant vapors for catalytic conversion or contact treatment to raise the temperature of such vapors above that which was employed in effecting their separation from source material before introducing them into the reaction chamber containing contact mass. Other objects and advantages include simplicity of apparatus and of operation of the process, a low consumption of steam or equivalent vaporizing or processing fluid, the production of a charge having selected properties and comprising clean, dry reactant vapors which will provide a good operation in the reaction chamber, a matter of special concern when the reaction chamber contains adsorbent and/or absorbent or catalytic material, and the maximum utilization of the starting material. Another object is to remove the difficultly vaporizable components, which, if sent to a converter or reaction chamber along with the lighter vapors, normally require large amounts of steam or equivalent vaporizing fluid to prevent condensation in the reaction zone and also normally result in the production of undesirably large amounts of gas and coke, which latter, in the case where a contact mass is used in the reaction or transformation zone, tends rapidly to clog up and poison the mass, thereby hindering or stopping the operation.

Still other objects and advantages will appear, and a quick understanding of the invention as a whole can be had, by reference to the accompanying drawings, in which:

Fig. 1 is a diagrammatic lay-out of one form of apparatus for carrying out the invention showing a separator, a converter, heat exchangers, a heater, and a flash pot or means for separating out the light material or naphtha, if desired, when a starting material such as crude petroleum oil is employed;

Fig. 2 is somewhat like Fig. 1 except that the heat exchange system and flash pot or equivalent of Fig. 1 is omitted and a viscosity breaker or equivalent, in addition to certain apparatus shown in Fig. 1, is here illustrated;

Fig. 3 is much like Fig. 2 except that apparatus for withdrawing naphtha or light material follows the viscosity breaker, and a heater for revaporization of the bottoms from such apparatus follows thereafter;

Fig. 4 is also similar to Fig. 2 with the variation that the overhead from the separator following the viscosity breaker is passed through a heating coil together with the vapors from the first separator; and Fig. 5 is like Fig. 2 except that a fractionating column or the like replaces the tar separator and apparatus is shown for passing the overhead from the viscosity breaker tar separator dephlegmator back into the fractionating column.

Referring more in detail to the drawings, in the several figures of which like reference characters denote similar parts, 1 is a converter or reaction chamber which may be filled with a suitable contact mass or catalyst. Products pass from the converter through heat exchangers 2 and 3. A starting material, such as crude petroleum oil, is forced by pump 4 through heat exchanger 3 and thence may pass through duct 5, controlled by valve 5a into a flash pot F or equivalent apparatus for the removal of naphtha, the bottoms passing out through line 6; or the starting material, without removal of naphtha, may be passed directly through branch 7, controlled by valve 7a. Whether or not the naphtha is removed, the material may pass through line 8, controlled by valve 8a and through heat exchanger 2, or by-pass the heat exchanger through duct 9, controlled by valve 9a and pass through duct 10, then through heating means which may be the convection coils 11 of furnace 12 and into tar separator 13, or equivalent. Steam or other vaporizing fluid, such as hydrocarbon gases, carbon dioxide or the like, is introduced through duct 14 in amounts controlled by valve 14a and becomes admixed with the crude oil or topped crude during its passage through coils 11. The quantity of steam or other fluid admitted by valve 14a controls the nature of the tar or residuum withdrawn from separator 13 through line 15, controlled by valve 15a; the more steam or equivalent which is admitted through valve 14a, the heavier and higher boiling will be the residuum withdrawn through line 15 from the separator 13. In some cases, no steam at all is added as, for example, when the whole crude is charged without first removing the naphtha. The character of the residuum withdrawn through line 15 is normally controlled so that it has a gravity of the order of 5° to 20° or 25° A. P. I., for example 5° to 12° A. P. I. where the residuum is to be discarded from the process. When the residuum is to be subjected to a viscosity breaking operation, as for example, in apparatus as illustrated in Figs. 2, 3, 4 or 5 of the appended drawings, it may be controlled to a gravity of the order of 10° to 20° or 10° to 25° A. P. I.

The vapors which pass from separator 13 through line 16 are free of readily condensable material and these vapors are then superheated by passage through heating coils 17 which may be the radiation bank in the furnace 12 and thence pass into and through converter 1 at a temperature which may often be substantially above that maintained in separator 13, the products of reaction passing out through duct 18 and heat exchangers 2 and 3, as above described.

It is obvious that in place of using a crude oil as a starting material and effecting a separation of naphtha in flash pot F, a topped crude could be employed and passed directly to heating coils 11 with or without previous heat exchange, as desired. Where crude oil is the starting material and flash pot F or equivalent is not employed, but the whole crude is fed to coil 11, often no steam or equivalent vaporizing fluid will be required and, if any is required, the amounts will be substantially smaller than in the case above described. The vapors from separator 13, including the naphtha, will all be superheated and passed through the converter 1. In this case, the conditions of the reaction chamber 1 are controlled so as to accomplish a reforming of the naphtha simultaneously with the cracking or conversion of the heavier fractions.

*Example*

Where an East Texas crude, which is typical of Mid-Continent crudes, is the starting material, it is heated to a temperature of about 350° F., by heat exchange with hot vapors from the converter, and then passed to the flash chamber held at a pressure of about 25 pounds per square inch gage where the naphtha vapors comprising about 30% of the crude are removed. The topped crude is again sent into heat exchange relation with the hot vapors from the converter to obtain all the preheat available from that source; thence it is passed through the heater coil or tube still where it is raised to 830° F. and mixed with about 5% by weight of steam. The topped crude, vaporized to substantial extent, is then passed into the separator which is held at a pressure of about 25 pounds per square inch gage, where the unvaporized portion, comprising approximately 5% of the whole crude or about 7% of the topped crude, is removed. The hydrocarbon vapors and steam from the separator are sent through the superheating coil and heat is added equivalent to a temperature rise of about 30° F. at separator pressure, which is approximately equivalent to radiation losses between the still and converter and that due to drop in temperature resulting from decreases in pressure.

In Fig. 2 a starting material such as crude oil or topped crude, which latter may result from a topping or stripping operation of any known or desired type, as for example, after the heat exchange and separating steps indicated in Fig. 1, is passed through line 10 and heating coils 11 into the separator 13a. The overhead from separator 13a passes through superheating coils 17 of the furnace 12 to provide clean charge for the converter 1. The liquid or residual material from separator 13a, which is normally of a somewhat lower boiling range, or, rather, of a somewhat higher gravity than that usually withdrawn from separator 13 of Fig. 1, is passed through line 15 and forced by pump 19 through viscosity breaker 20, which may consist merely of a group of heating coils in a furnace maintained under conditions to effect a mild thermal cracking. The gravity of a liquid withdrawn through line 15 is controlled under any given temperature conditions in the separator by the amount and character of the vaporizing fluid which is present with the hydrocarbon charge. The vaporizing fluid may consist of all or any desired proportion of naphtha or other or lower boiling hydrocarbons which may be initially present with the charge, or it may consist of steam, low boiling hydrocarbons, or other vaporizing fluid which may be introduced into the system through line 14 in controlled amount, or, permissibly, at an earlier point in the system. This type of control of the charge for viscosity breaking is also applicable in connection with apparatus such as illustrated in Figs. 3, 4 and 5 of the drawings discussed in detail hereafter. By way of variation from the specific apparatus described above, the viscosity breaker may consist of a reaction chamber of the type disclosed in United States Patent No. 1,806,997 issued to Alfred Joseph on May 26, 1931, filled with a relatively inert but porous contact mass, such for example as the carrier disclosed in United States Patent No. 1,818,403, issued to Alfred Joseph on August 11, 1931, and including absorbent materials such as fragmentary or molded pieces of relatively inert silicates of alumina, etc., maintained under proper conditions of temperature and pressure. Fluid passes from the viscosity breaker 20 through duct 21 into tar separator, flash pot, or equivalent, 22, where the heaviest portions of the products of the viscosity breaking operation, for example components having a gravity of the order of 5° to 12° A. P. I., are separated and withdrawn as liquid through valved line 23. Steam or equivalent may be admitted into the coils of the viscosity breaker by line 24 and valve 25, to control viscosity breaking as desired and to prevent drastic thermal cracking. Steam or equivalent may also be introduced into the separator 22 through branch line 26 controlled by the valve shown. The admission of steam or equivalent may serve as a method of controlling the conditions of operation of the separator 22 and the character of the tar or liquid withdrawn therefrom. The more high-temperature steam introduced into separator 22 or into the fluids passing thereto, the heavier and more high boiling will be the liquid withdrawn through line 23.

Vaporized products of the viscosity breaking operation pass from separator or flash pot 22 and may, when necessary, have an additional amount of steam or equivalent admitted therewith to increase their superheat by adjustment of the valve 27. Such vapors then pass on through the line 28 and, together with the vapors coming from superheater 17, pass through line 29 into converter 1. If the starting material passed through the apparatus of Fig. 2 be East Texas crude or topped crude, such as disclosed in the above example, the amount of liquid withdrawn from separator 13 may be about 15%, or of that order, rather than approximately 5%, as in the aforementioned example.

The apparatus shown in Fig. 3 will be readily understood in connection with the description given for Fig. 2, with certain exceptions. The material leaving viscosity breaker 20, instead of going directly to separator 22a passes to a fractionating column 30 or equivalent apparatus for the removal of naphtha, particularly any low grade naphtha or gasoline which has been produced in the viscosity breaking step. The bottoms from column 30 pass to heater 31 to re-vaporize, or at least partly revaporize, the same. Steam may be introduced to heater 31 through valved line 32 in any desired amount. The fluid passing from heater 31 enters tar separator 22a or equivalent, whose operation may be controlled similarly to that of separator 22 in Fig. 2, liquid being withdrawn through duct 23 and vapors passing from the separator through line 28a and entering the converter 1 along with superheated vapors coming from superheating coils 17 of the furnace 12. The desired degree of superheat of the vapors passing up through line 28a may be supplied by a controlled admission of the vaporizing fluid or superheated steam from the line controlled by valve 27.

In the modification shown in Fig. 4, the bottoms from separator 13 are forced by pump 19 through viscosity breaker 20 and thence enter the tar separator or dephlegmator 22b, but, in this embodiment, the vapors from separator 22b pass through the line 33 and through the superheater 17 along with the vapors passing from separator 13, whence the combined vapors pass to converter 1 to undergo the desired conversion or reaction. Ordinarily, no steam need be introduced with the vapors passing from separator 22b as contrasted with a fairly frequent need in the case when the vapors are not further heated before entering converter 1.

In Fig. 5, fractionating column 13b replaces the tar separator 13 of the previously described modification and vapors emerging from separator 22c following the viscosity breaker 20 pass through line 34 back into the column 13b rather than directly to the converter 1 or directly to the superheating coils 17. Otherwise, the embodiment shown in Fig. 5 will be readily understood from the description of Figs. 2 and 4.

While the function of coil 11, shown in all the figures of the drawings, is primarily that of heating up the starting material to effect a partial or substantial vaporization thereof, in certain cases the coil may be operated to perform some viscosity breaking of the hydrocarbons. However, this action will not be permitted to reach such proportions that the octane rating of the motor fuel passing from a subsequent converter (which may contain a catalyst) is lower than is desired.

In practicing the aspects of the invention wherein steam or other added inert or vaporizing fluid in controlled quantity is utilized to attain at least a portion of the desired degree of superheat in the ultimate charge to the converting zone, it is evident that at least a portion of such fluid may be admitted to viscosity broken material during or immediately after separation of vapors from tar, as by suitably located lines 26 in the embodiments of the invention disclosed in Figs. 2, 3, 4 and 5, or, any desired portion of such diluent fluid may be injected into otherwise completely processed vapors prior to their admission into the converting unit, as for example, through suitably located conduits such as conduits 27 (shown in Figs. 2 and 3). At least a portion of the desired hot diluent intended for this purpose may, in many instances, be included in the vapor stream leaving superheater 17.

It will be noted that, in all of the embodiments shown, components which cause condensation or necessitate the use of large quantities of vaporizing fluid are removed from the charge to the converter, thereby avoiding condensation and greatly minimizing the use of steam or other vaporizing fluid. Further, this removal is effected economically and conveniently without necessitating the use of expensive or complicated equipment, the apparatus employed being inexpensive and easy to operate.

A viscosity breaker, as shown in Figs. 2, 3, 4 and 5, is employed where conditions of temperature and pressure are desired in the reaction chamber which will not permit vaporization of the particular chosen starting material to a low percentage of bottoms, which can economically be rejected from the conversion process, without the use of large or excessive amounts of steam or equivalent, or, in other words, where it is desired to convert as high an amount of the starting material as possible to gasoline or motor fuel. In other cases where different conditions obtain in the reaction chamber, or where raw material for making road asphalt is in large demand, or where the particular starting material contains a low proportion of heavy components, it may be unnecessary to employ a viscosity breaker and the embodiment of my invention shown in Fig. 1 may be satisfactorily employed.

The invention is not to be limited by illustrations or examples but is intended to include all modifications within the scope of the appended claims.

What I claim is:

1. In the preparation of a vaporous charge for a conversion operation from a composite hydrocarbon material having a substantial boiling range and containing components which can not be directly vaporized by heat alone but can be put in vapor form with the aid of a vaporizing medium, steps of process which comprise heating and vaporizing a substantial portion of said hydrocarbon material, separating unvaporized hydrocarbon material from the hydrocarbon vapors in a separation zone, subjecting said unvaporized hydrocarbon material to conditions of mild cracking to effect a viscosity breaking thereof and to produce vaporizable components, separating said vaporizable components as vapor from heavy residue in a second separation zone, continuously passing vapor from said first separation zone directly and without intermediate condensation through a superheating zone into a conversion zone maintained under cracking conditions, and adding vapor issuing from said second separation zone to said first-mentioned vapors before they enter said superheating zone, said vapors entering said superheating zone including vaporizing medium and certain of said components of the original charge not directly vaporizable by heat alone.

2. In the preparation of vapor charge for conversion operation from hydrocarbon material composed largely of hydrocarbons higher boiling than gasoline and containing components which cannot be vaporized by heat alone, the process steps comprising vaporizing a substantial portion of said hydrocarbon material by simultaneous use of heat and a vaporizing fluid, separating unvaporized hydrocarbon material from the resulting vapors admixed with vaporizing fluid, subjecting the separated unvaporized hydrocarbons to mild cracking conditions to effect viscosity breaking thereof and to produce vaporizable higher boiling hydrocarbons, separating said vaporizable higher boiling hydrocarbons in vapor form from viscosity broken residue, superheating said higher boiling hydrocarbon vapors, and feeding the superheated vapors admixed with the aforesaid vapors and vaporizing fluid and in superheated condition to a conversion zone maintained under cracking conditions.

3. In the preparation of a vaporous charge for a conversion operation from composite hydrocarbon material having a wide boiling range, composed largely of hydrocarbons above the gasoline boiling range and containing components which cannot be directly vaporized by heat alone, the steps of process which comprise heating and vaporizing a substantial portion of said hydrocarbon material with the aid of a vaporizing fluid, separating unvaporized hydrocarbon material from the hydrocarbon vapors, subjecting said unvaporized hydrocarbon material in a continuous confined stream to conditions of mild cracking to effect a viscosity breaking thereof, separating a portion of the heaviest, highest boiling components of the fluid products of said viscosity breaking operation from lower boiling components thereof in a confined liquid-vapor separating zone, effecting a superheating of vapor leaving said last-mentioned separating zone by the addition of a vaporizing fluid thereto, passing the resulting superheated vapor into a conversion zone maintained under conditions so as to effect an active cracking thereof to produce lower boiling hydrocarbons including gasoline, and superheating the first-mentioned hydrocarbon vapors and passing them to said conversion zone.

4. In the preparation of a vaporous charge for a conversion operation from a composite hydrocarbon material having a substantial boiling range and containing components which cannot be directly vaporized by heat alone, the steps of process which comprise heating and vaporizing a substantial portion of said hydrocarbon material, separating unvaporized hydrocarbon material from the hydrocarbon vapors, subjecting said unvaporized hydrocarbon material to conditions of mild cracking to effect a viscosity breaking thereof, fractionating the fluid emerging from said viscosity breaking operation to separate out a low boiling fraction from said fluid, then separating a portion of the heaviest, highest boiling components from the remaining hydrocarbon fluid, passing the said remaining hydrocarbon fluid in vapor form into a conversion zone and superheating said first-mentioned hydrocarbon vapors and passing them into said conversion zone.

5. Apparatus for the preparation of a hydrocarbon charge for a converter containing a contact mass from a composite hydrocarbon material of the character of a crude petroleum oil or fraction thereof which comprises, in combination, means for heating and substantially vaporizing the hydrocarbon material, a separator for removing liquids from vapors, following and connected to said means for heating so as to receive fluid therefrom, a second heating means following and connected to said separator to receive vapors therefrom and to superheat the same, viscosity breaking means, a duct for passing liquid from said separator to said viscosity breaking means, a fractionator for the removal of naphtha following and connected to said viscosity breaking means to receive fluid products therefrom, a heater and vaporizer following and connected to said fractionator for substantially vaporizing the liquid therefrom, a tar separator following and connected to said heater and vaporizer to receive fluid therefrom and to separate out the liquid components from the vapors, a converter, and ducts for passing vapors from said tar separator and from said second heating means into said converter.

6. Apparatus for the preparation of a hydrocarbon charge for a converter containing a contact mass from a composite hydrocarbon material of the character of a crude petroleum oil or fraction thereof which comprises, in combination, means for heating and substantially vaporizing the hydrocarbon material, a separator for removing liquids from vapors, following and connected to said means for heating so as to receive fluid therefrom, a second heating means following and connected to said separator to receive vapors therefrom and to superheat the same, a thermal viscosity breaker, a duct for passing liquid from said separator to said viscosity breaker, a tar separator connected to said viscosity breaker to receive fluid products therefrom, a converter, a conduit connection between said second heating means and said converter for conducting superheated vapors to the latter, a conduit for conducting vapor from said tar separator to said converter, and means associated with said last named conduit for superheating vapors traversing the same.

7. In the preparation of a vaporous charge for a conversion operation from composite hydrocarbon material of wide boiling range, composed predominantly of hydrocarbons above the gasoline boiling range and containing components which cannot be directly vaporized by heat alone without substantial thermal cracking, the steps of process which comprise heating and vaporizing said material to substantial extent with the aid of a vaporizing fluid, separating a liquid fraction, comprising the heaviest, highest boiling components thereof, from the remaining vapors; superheating said remaining vapors; passing said liquid fraction in a confined stream through a heated zone under conditions so as to effect a mild cracking or viscosity breaking thereof, continuously passing said confined stream from said heated zone to a liquid-vapor separating zone, therein continuously separating the heaviest, highest boiling liquid components from the lower boiling hydrocarbon vapors; effecting a superheating of the last-mentioned vapors by the addition of steam and passing them in admixture with the aforesaid remaining vapors which have been superheated into a conversion zone containing a cracking catalyst and maintained under conditions so as to produce lower boiling hydrocarbons including gasoline from higher boiling hydrocarbons.

8. In the preparation of a vaporous charge for a conversion operation from composite hydrocarbon material having a wide boiling range, composed to a large extent of hydrocarbons above the gasoline boiling range and containing components which cannot be directly vaporized by heat alone without substantial thermal cracking, the steps of process which comprise passing a confined stream of said hydrocarbon material through a heating zone, whereupon said material is vaporized to substantial extent, then separating unvaporized hydrocarbon material from vaporized material while maintaining a vaporizing fluid in admixture with the partially vaporized hydrocarbon material, further passing said vaporized material in a confined stream through a second heating zone so as to superheat said vapors, passing the said unvaporized hydrocarbon material in a confined stream through a heated zone under conditions so as to effect a mild thermal cracking or viscosity breaking thereof, continuously passing said confined stream from said heated zone to a liquid-vapor separating zone, therein continuously separating a portion of the heaviest, highest boiling materials from the remaining vaporous hydrocarbon fluid, adding superheated steam to said remaining vaporous fluid so as to superheat the same; and subjecting the said remaining hydrocarbon fluid in superheated vapor phase, and the aforesaid vaporized material which has been superheated, to a conversion in the presence of a catalyst or contact material comprising activated hydrosilicate of alumina in a form capable of regeneration in situ, said catalyst being maintained under conditions so as to effect a conversion of higher boiling to lower boiling hydrocarbons including gasoline.

9. In the preparation of a vaporous charge for a conversion operation from composite hydrocarbon material having a substantial boiling range and containing components which cannot be directly vaporized by heat alone, the steps of process which comprise heating and vaporizing a substantial proportion of said hydrocarbon material in the presence of a controlled amount of steam, separating unvaporized material from the hydrocarbon vapors and steam, the temperature to which the hydrocarbons are heated to effect separation being below temperatures where substantial thermal cracking will occur and the steam being controlled in amount so that the said unvaporized hydrocarbon material or liquid which is separated is predominantly within the gravity range of 10° to 25° A. P. I., subjecting said unvaporized hydrocarbon material to conditions of mild cracking to effect a viscosity breaking thereof; admixing products of said viscosity breaking operation which are above the gasoline boiling range, exclusive of a small proportion thereof having a gravity heavier than substantially 12° A. P. I., in vapor form with the first-mentioned hydrocarbon vapors and steam, and passing the resultant vapor mixture into a conversion zone containing an adsorptive cracking catalyst; and, prior to introducing said vapors into said conversion zone, adding further heat and vaporizing fluid to said vapors so that the latter enter said conversion zone with the desired degree of superheat.

ALBERT G. PETERKIN.